United States Patent
Khamis et al.

(10) Patent No.: US 10,731,369 B2
(45) Date of Patent: Aug. 4, 2020

(54) AUTOMATIC RELIEF VALVE SYSTEM WITH WATER LEVEL SENSING FOR A FIBERGLASS SWIMMING POOL BODY

(71) Applicants: William Khamis, Fortville, IN (US); Edward Vondell, Fishers, IN (US)

(72) Inventors: William Khamis, Fortville, IN (US); Edward Vondell, Fishers, IN (US)

( * ) Notice: Subject to any disclaimer, the term of this patent is extended or adjusted under 35 U.S.C. 154(b) by 0 days.

(21) Appl. No.: 16/053,030

(22) Filed: Aug. 2, 2018

(65) Prior Publication Data
US 2019/0136558 A1 May 9, 2019

Related U.S. Application Data

(60) Division of application No. 15/611,858, filed on Jun. 2, 2017, now Pat. No. 10,167,649, which is a
(Continued)

(51) Int. Cl.
| | |
|---|---|
| *E04H 4/14* | (2006.01) |
| *E02D 17/20* | (2006.01) |
| *E02B 3/12* | (2006.01) |
| *E04H 4/00* | (2006.01) |
| *E04H 4/12* | (2006.01) |
| *H04L 12/26* | (2006.01) |
| *H04L 12/721* | (2013.01) |
| *H04L 29/12* | (2006.01) |
| *F16K 15/00* | (2006.01) |
| *F16K 17/02* | (2006.01) |

(Continued)

(52) U.S. Cl.
CPC ............... *E04H 4/14* (2013.01); *E02B 3/122* (2013.01); *E02D 17/202* (2013.01); *E04H 4/0037* (2013.01); *E04H 4/12* (2013.01); *F16K 15/00* (2013.01); *F16K 17/02* (2013.01); *G05D 7/0635* (2013.01); *G08B 21/182* (2013.01); *H04L 43/0876* (2013.01); *H04L 45/14* (2013.01); *H04L 61/6022* (2013.01); *H04W 88/02* (2013.01)

(58) Field of Classification Search
CPC ............ E04H 4/0037; E04H 4/12; E04H 4/14
See application file for complete search history.

(56) References Cited

U.S. PATENT DOCUMENTS

| | | |
|---|---|---|
| 3,665,524 A | 5/1972 | Jannuzzi |
| 3,823,690 A | 7/1974 | Rynberk |

(Continued)

*Primary Examiner* — J C Jacyna
(74) *Attorney, Agent, or Firm* — C. John Brannon; Brannon Sowers & Cracraft PC

(57) ABSTRACT

A swimming pool assembly, including a pool body defining a top edge and an bottom connected by a wall, an access port positioned through the bottom, a first conduit connected to the access port and extending away from the body, a valve connected with the first conduit, a second conduit connected with the first conduit and extending toward the top edge, wherein the second conduit is water permeable. An actuator is positioned in the second conduit and connected to the valve. First and second water level sensors are positioned to measure ground water level and pool water level. A microprocessor is operationally connected to the water level sensors and to the actuator, wherein when the ground water level exceeds the pool water level by a predetermined amount, the microprocessor sends a signal to the actuator to open the valve.

8 Claims, 9 Drawing Sheets

Related U.S. Application Data continuation-in-part of application No. 14/874,880, filed on Oct. 5, 2015, now Pat. No. 9,769,045, which is a continuation-in-part of application No. 14/477,023, filed on Sep. 4, 2014, now Pat. No. 9,593,455.

(51) Int. Cl.
*G05D 7/06* (2006.01)
*G08B 21/18* (2006.01)
*H04W 88/02* (2009.01)

(56) References Cited

U.S. PATENT DOCUMENTS

| | | | |
|---|---|---|---|
| 3,908,206 A | 9/1975 | Grewing | |
| 3,969,868 A | 7/1976 | Bainter et al. | |
| 4,060,946 A | 12/1977 | Lang | |
| 4,227,266 A * | 10/1980 | Russell | E04H 4/12 |
| | | | 137/362 |
| 4,276,163 A * | 6/1981 | Gordon | B01D 24/008 |
| | | | 210/136 |
| 4,607,399 A | 8/1986 | Yovanofski | |
| 5,036,881 A | 8/1991 | Southmayd | |
| 5,790,991 A | 8/1998 | Johnson | |
| 6,158,064 A | 12/2000 | Downs | |
| 6,637,162 B1 | 10/2003 | Holland | |
| 7,425,107 B2 | 9/2008 | Derache | |
| 7,934,273 B1 | 5/2011 | Goettl | |
| 8,011,032 B2 | 9/2011 | Cline | |
| 8,011,859 B2 | 9/2011 | Freitag | |
| 8,607,373 B2 * | 12/2013 | Van Schenk Brill | E04H 4/1218 |
| | | | 4/507 |
| 9,593,455 B2 * | 3/2017 | Khamis | G08B 21/182 |
| 9,769,045 B2 * | 9/2017 | Khamis | E02D 17/202 |
| 10,167,649 B2 * | 1/2019 | Khamis | E04H 4/12 |
| 10,301,836 B2 * | 5/2019 | Khamis | G05D 7/0635 |
| 2006/0162063 A1 | 7/2006 | Weissenecker | |
| 2007/0144082 A1 | 6/2007 | Kantor | |
| 2008/0290046 A1 | 11/2008 | King | |
| 2011/0252557 A1 | 10/2011 | Oat | |
| 2015/0052674 A1 | 2/2015 | Mewett | |

* cited by examiner

AUTOMATIC RELIEF VALVE SYSTEM WITH WATER LEVEL SENSING FOR A FIBERGLASS SWIMMING POOL BODY

CROSS-REFERENCE TO RELATED APPLICATIONS

This patent application is a divisional of, and claims priority to, co-pending U.S. patent application Ser. No. 15/611,858, which is a continuation-in-part of, and claims priority to, then co-pending U.S. patent application Ser. No. 14/874,880, filed on Oct. 5, 2015, which claimed priority to then co-pending U.S. patent application Ser. No. 14/477,023, filed on Sep. 4, 2014, which claimed priority to then U.S. Provisional Patent Application Ser. No. 61/873,468, filed on Sep. 4, 2013; and also claims priority to U.S. Provisional Patent Application Ser. No. 62/469,198, filed on Mar. 9, 2017.

TECHNICAL FIELD

The present novel technology relates generally to the field of excavation, and, more particularly, to the stabilization of in-ground fiberglass pool bodies, such as with valve systems to equalize hydrostatic forces and/or with extended geotextile sheets.

BACKGROUND

Preformed fiberglass swimming pools offer many advantages over in-situ formed shotcrete or concrete walled swimming pools. Fiberglass pool bodies may be quickly and inexpensively formed and require considerably less effort to put into the ground. The main drawback associated with fiberglass swimming pools has been the tendency for the bottom and/or sides to bulge inward from geological and/or hydrostatic forces from accumulated groundwater if the backfill around the pool is not properly done. The backfill around the pool perimeter is typically sand, gravel, or a combination of the two. In the case of sand, a poor backfilling job may result in settling of the sand, which may lead to an inward bulging of the pool sidewalls. Gravel backfill is less prone to flowing and settling, but is harder to evenly distribute around the outer surface of a pool, especially if that surface is irregular. Further, some pool owners insist upon emptying the pool of water, such as for thorough cleaning, and fiberglass pool designs rely on the water to provide positive pressure to resist inward bulging of the sides and/or hydrostatic forces pushing on the pool bottom, which can urge the pool upwardly, resulting in a ruptured pool bottom and/or dislodgement of the pool body.

Ground water may cause major damage and expensive repair costs to in-ground pools, if not managed properly. Swimming pool owners have concrete pools popping out of the ground, vinyl liners floating, and fiberglass pools being warped, cracked and dislodged due to the application of uncontrolled hydrostatic forces.

Thus, there remains a need for a method and apparatus that would allow easy installation of a preformed fiberglass pool body while providing additional support to resist the inward bulging of the pool sidewalls over time. The present novel technology addresses this need.

SUMMARY

The present novel technology relates to a method and apparatus for providing a support and reinforcement system for a fiberglass swimming pool. One object of the present novel technology is to provide an improved fiberglass swimming pool system. Related objects and advantages of the present novel technology will be apparent from the following description.

DETAILED DESCRIPTION OF THE PREFERRED EMBODIMENT

Figure 1:
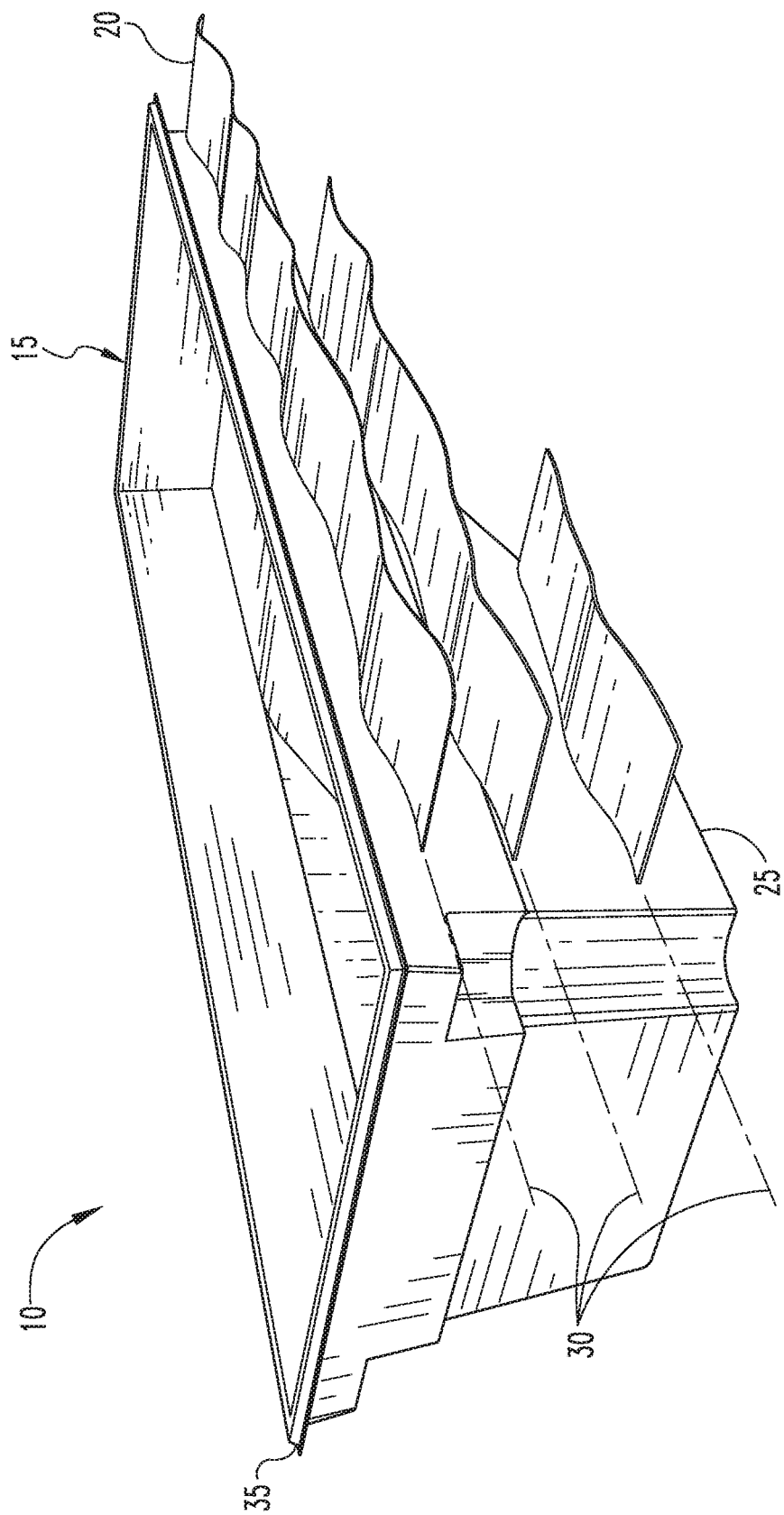
FIG. 1 is a top plan view of a first embodiment fiberglass pool assembly of the present novel technology.
Figure 2:
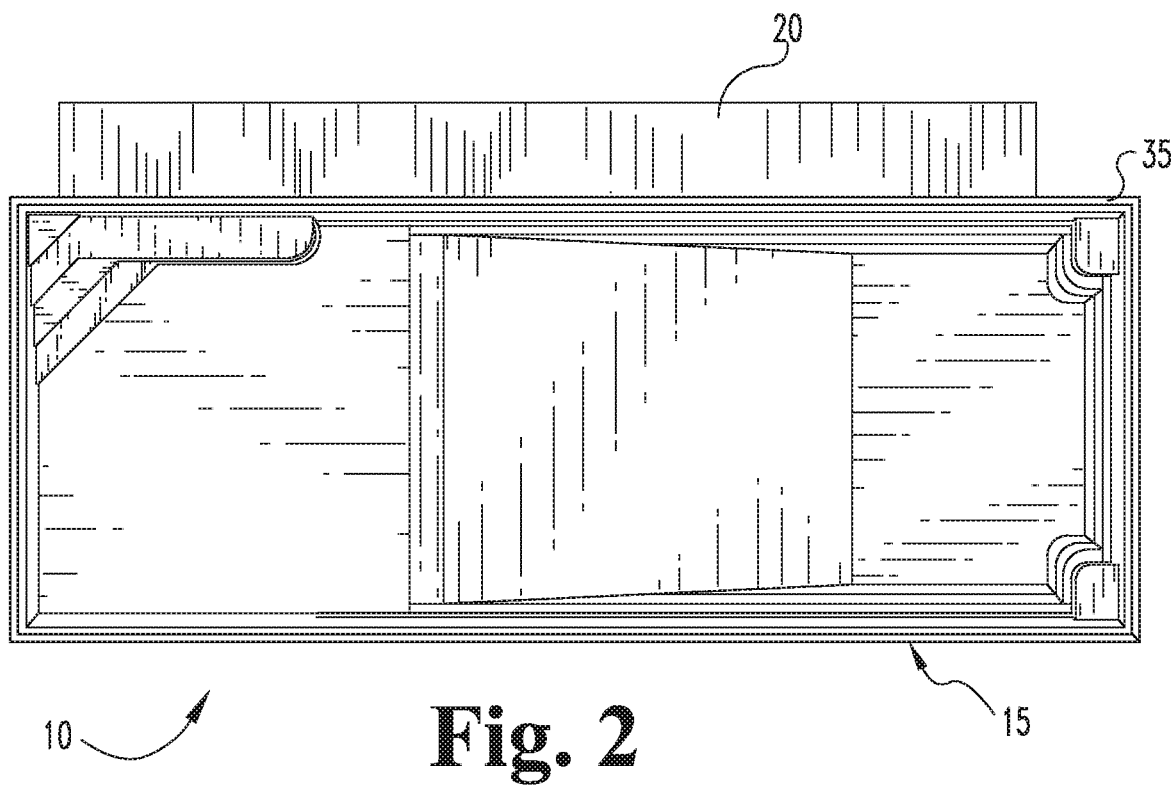
FIG. 2 is a side elevation view of the pool assembly of FIG. 1
Figure 3:
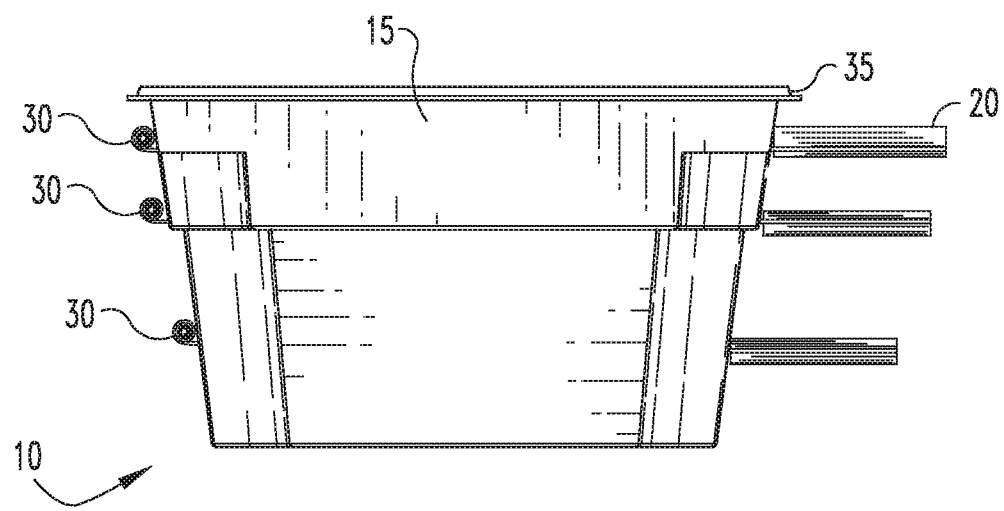
FIG. 3 is a perspective view of the curtain of FIG. 1 having anchor sheets deployed therearound.
Figure 4:
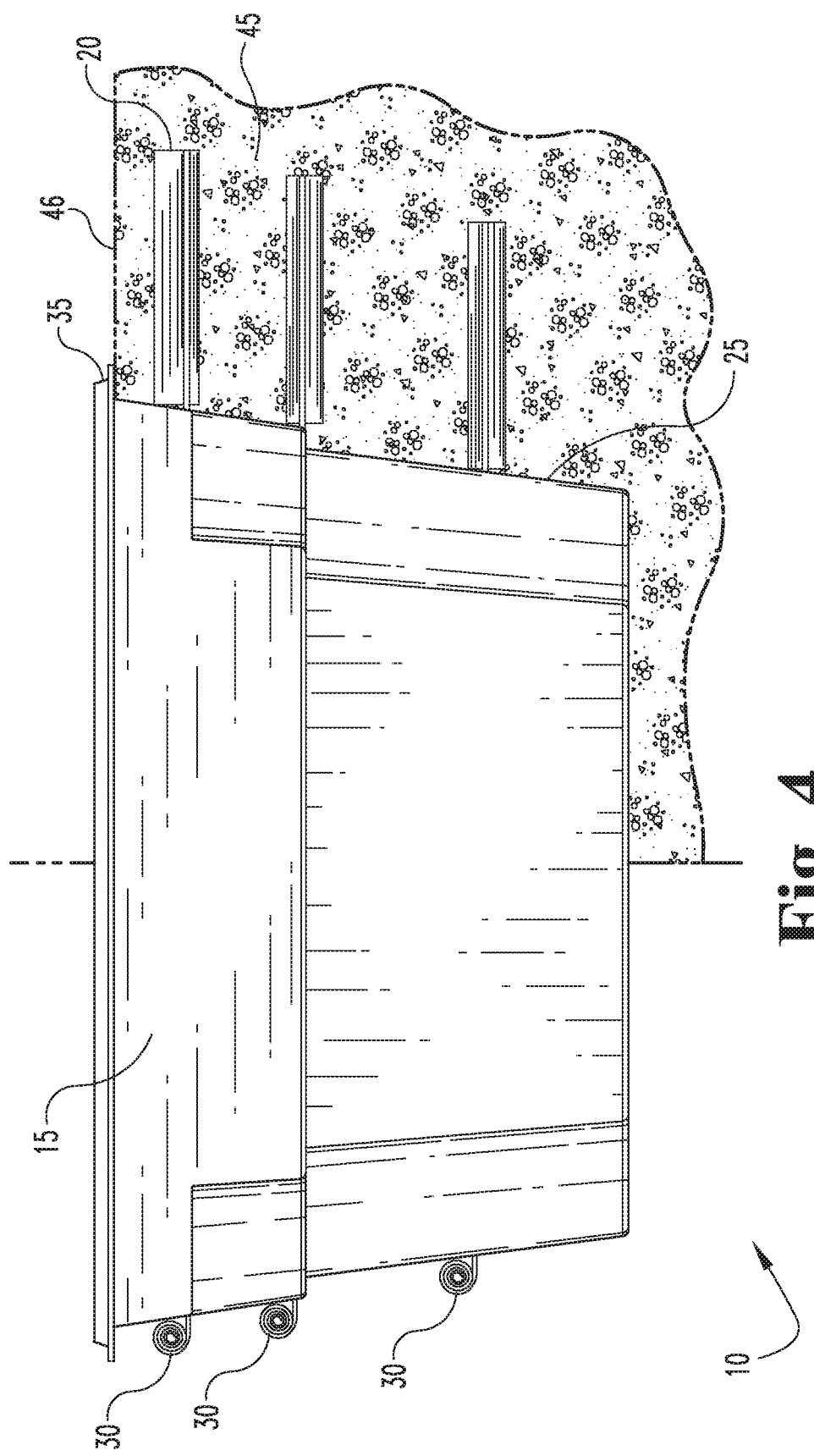
FIG. 4 is a perspective view of the curtain of FIG. 1 having attached anchor sheets rolled up against the pool body.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Geotextiles are stable fabrics designed to not degrade when embedded in soil for extended periods of time. Geotextiles are also permeable so as to allow the passage of fluids therethrough, such that they may be used to provide reinforcement without also creating a drainage problem. Geotextile materials are typically made from polymers such as polypropylenes, polyesters, or the like, and may be formed by such processes as weaving, spin melting, heat bonding, or the like.

The present novel technology relates to a system 10 for mounting or installing a fiberglass or like preformed swimming pool body 15 into a freshly dug excavation, and includes a at least one, and more typically a plurality of, flexible, tough sheet segments 20 securely bonded to one or more exterior sidewalls 25 of the pool body 15 for extension therefrom. Typically, a plurality of geotextile, fiberglass, or like material anchoring sheets 20 are bonded to the pool body 15 at one or more exterior sidewalls 25 at one or more different elevations 30 (distances from the top lip 35 of the pool body 15 when oriented for positioning in the ground) and are spaced around the pool body perimeter. Prior to putting the pool body 15 into the ground, each geotextile sheet 20 is typically rolled up and secured to the pool sidewall 20 for transport and convenience of storing, such as with a zip tie or the like. After the pool body 15 is positioned into the excavation, the excavation around the pool body 15 is backfilled (typically with gravel) to the level of the lowermost sheet(s) 20. The lowermost sheets 20 are unrolled and extended over the backfill surface and are placed thereupon, and additional backfill material (typically soil and/or sand and/or gravel and/or combinations thereof) is backfilled into the excavation onto the extended sheets 20. When the level of backfill material reaches the level of the next set of sheets 20, the sheets 20 at that elevation 30 are likewise extended and the filling process is continued. The weight of the soil pressing on the extended sheets 30, as securely bonded to the fiberglass outer walls 25, is sufficient to generate an outward force on the walls 25 to at least partially counter the inward force produced by the soil around the pool body 15. Optionally, the backfill may be compacted manually or with a mechanical compactor at one or more points during the backfilling process.

The geotextile sheets 20 are typically about a meter wide or long, and typically extend up to about meter from the pool sidewall, more typically about 0.5 meters, and still more typically about 0.25 meters, although the width and length of the sheets 20 may vary from pool body 15 to pool body 15. Likewise, the total number of sheets 20 required will vary with the total surface area of the pool sidewalls 25. In other words, bigger pool bodies 15 may require more sheets 20.

Typically, the sheets 20 are attached at elevations (depths or distances) 30 of about two feet from the lip 35 of the pool body 15, about four feet from the lip 35 of the pool body 15, and about six feet from the lip 35 of the pool body 15. These distances may vary with pool body 15 depth, and some pool bodies 15 may require sheets 20 positioned at only one or two elevations 30. Alternately, the sheets 20 may each be attached at their own individual elevations 30 or distances from the pool body lip 35.

The sheets 20 are typically securely bonded to a pool exterior sidewall 25, such as by an additional application of a fiberglass fusion bonds or volumes 40, by an adhesive material bond 40, or the like.

In operation, the sheets 20 extend from the pool body 15 to which they are secured into the excavation into which the pool body 15 has been placed. Backfill is poured to partially fill the excavation. Respective portions of at least some of the respective sheets 20 (typically those positioned at the lowermost elevations 30 or levels from the lip 35) extend onto the relatively flat, horizontal backfill portion that has partially filled the excavation around the pool body 15, where they are anchored such as by extending anchoring members therethrough, by positioning weighted masses (i.e., more backfill) thereupon, or the like. This process is repeated until all of the sheets 20 have been extended onto backfill and then covered with more backfill and buried and anchored in place. The weight of the backfill material on the sheets 20 generates a frictional anchoring force thereupon that resists movement of the sheets 20, thus creating a pulling force on the pool exterior sidewalls 15 opposing any pushing force generated by the backfill thereagainst.

This process may define a method of stabilizing the sidewalls of a preformed swimming pool body 15, including bonding a first anchor sheet 20 to an exterior surface 25 of a preformed swimming pool body 15 and then extending the first anchor sheet 20 over a first volume of backfill material 45, followed by laying the extended first anchor sheet 20 on a first volume of backfill surface 50 and then burying the extended first anchor sheet 20 under a second volume of backfill material 45. The method is continued by next bonding a second anchor sheet 20 to an exterior surface 25 of a preformed swimming pool body 15, extending the second anchor sheet 20 over the second volume of backfill material 45, laying the extended second anchor sheet 20 on a second volume of backfill surface 50 and finally burying the extended second anchor sheet 20 under a third volume of backfill material 45. Additional elevations 30 of sheets 20 may be added accordingly. The anchor sheet 20 is typically a porous geotextile material. Typically, the first and subsequent anchor sheets 20 each define a plurality of geotextile segments arrayed in a row around the preformed swimming pool body 15 and positioned substantially equidistantly from a top edge 40. The backfill material 45 is typically selected from the group comprising soil, sand, gravel and combinations thereof.

The pool body 15 may be of any convenient shape, including rectangular, generally rectangular, kidney shaped, round, oval, or the like. The sheets 20 may extend from opposing sidewalls 25, adjacent sidewalls 25, from random positions, or the like.

In one alternate embodiment, geotextile sheets 20 are affixed to fiberglass pool bodies 15 already put into the ground. The soil and/or backfill material around the emplaced pool bodies 15 is partially excavated, and one or more geothermal sheets 20 are attached at one end to the pool body sidewall 25, such as with a fiberglass application, adhesive, or the like. The sheets 20 are then extended and the excavated soil and/or backfill is replaced to weight down and bury the one or more sheets 20 to hold them in place and generate the pulling forces on the fiberglass pool sidewall 25.

Figure 5:
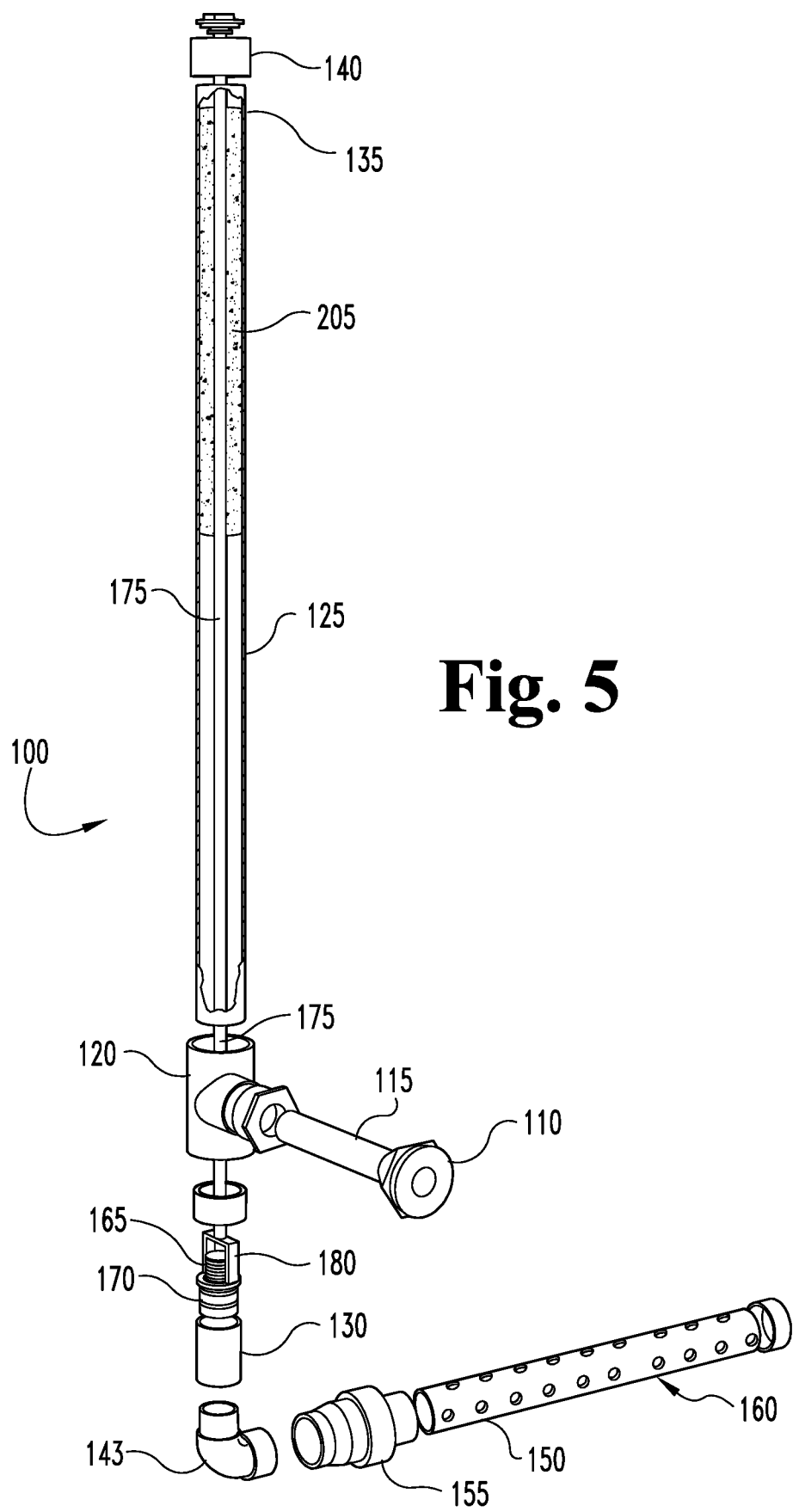
FIG. 5 is an exploded perspective view of a hydro valve system for equalizing hydrostatic pressure without and within a pool body, according to another embodiment of the present novel technology.
Figure 6:
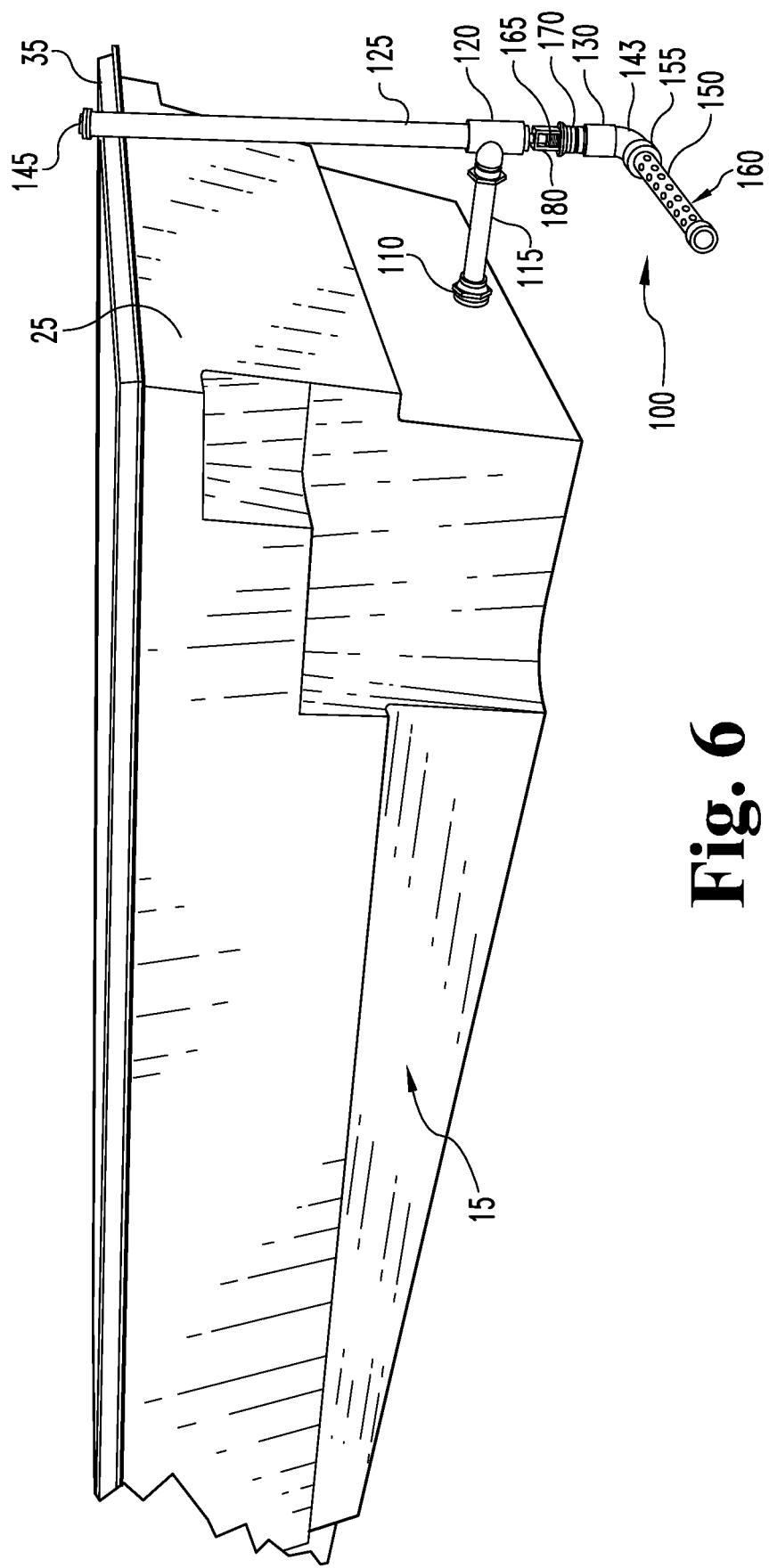
FIG. 6 is a first perspective view of the valve system of FIG. 5 engaged with a pool body.
Figure 7:
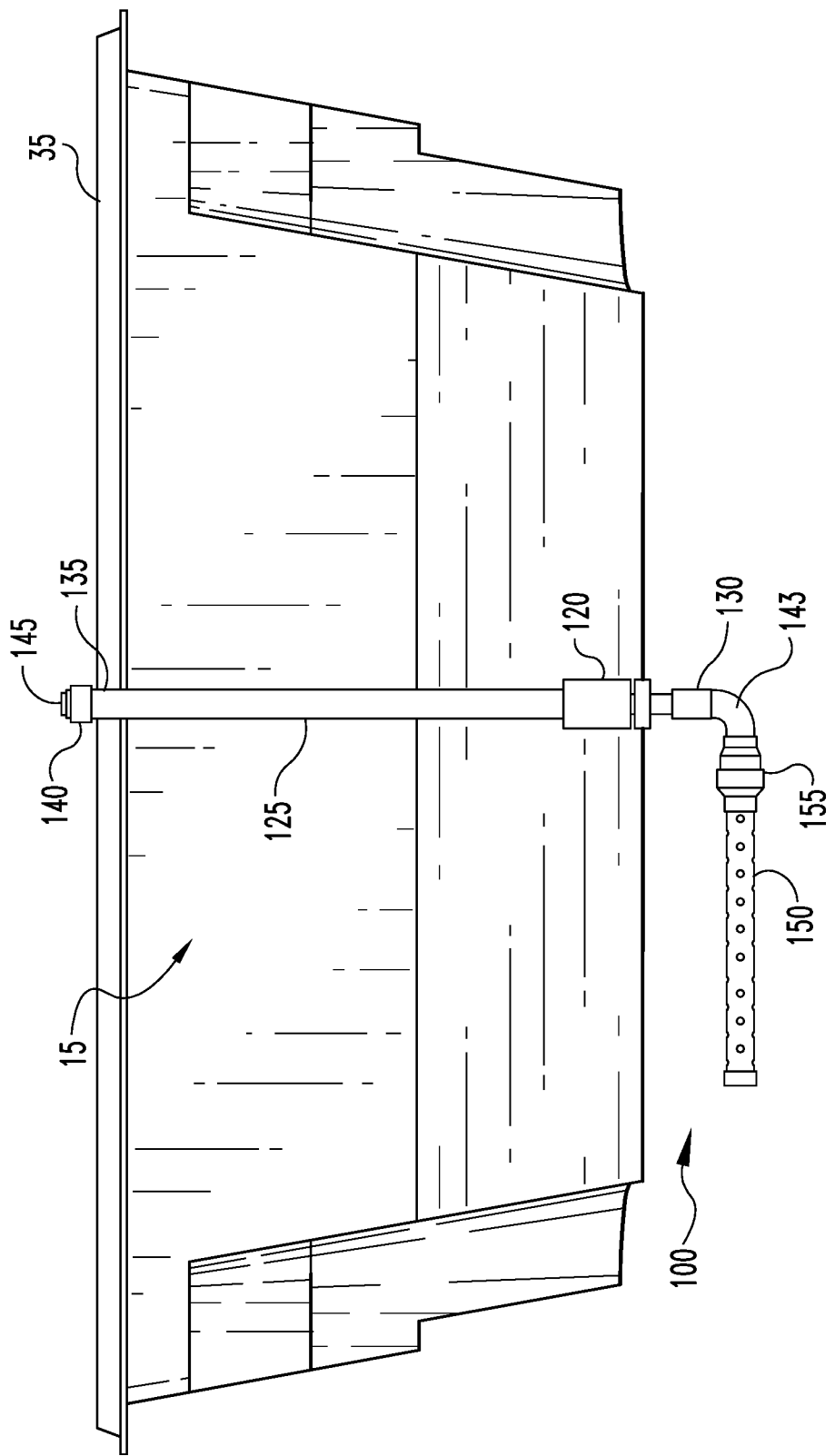
FIG. 7 is a second perspective view of the valve system of FIG. 5 engaged with a pool body.
Figure 8:
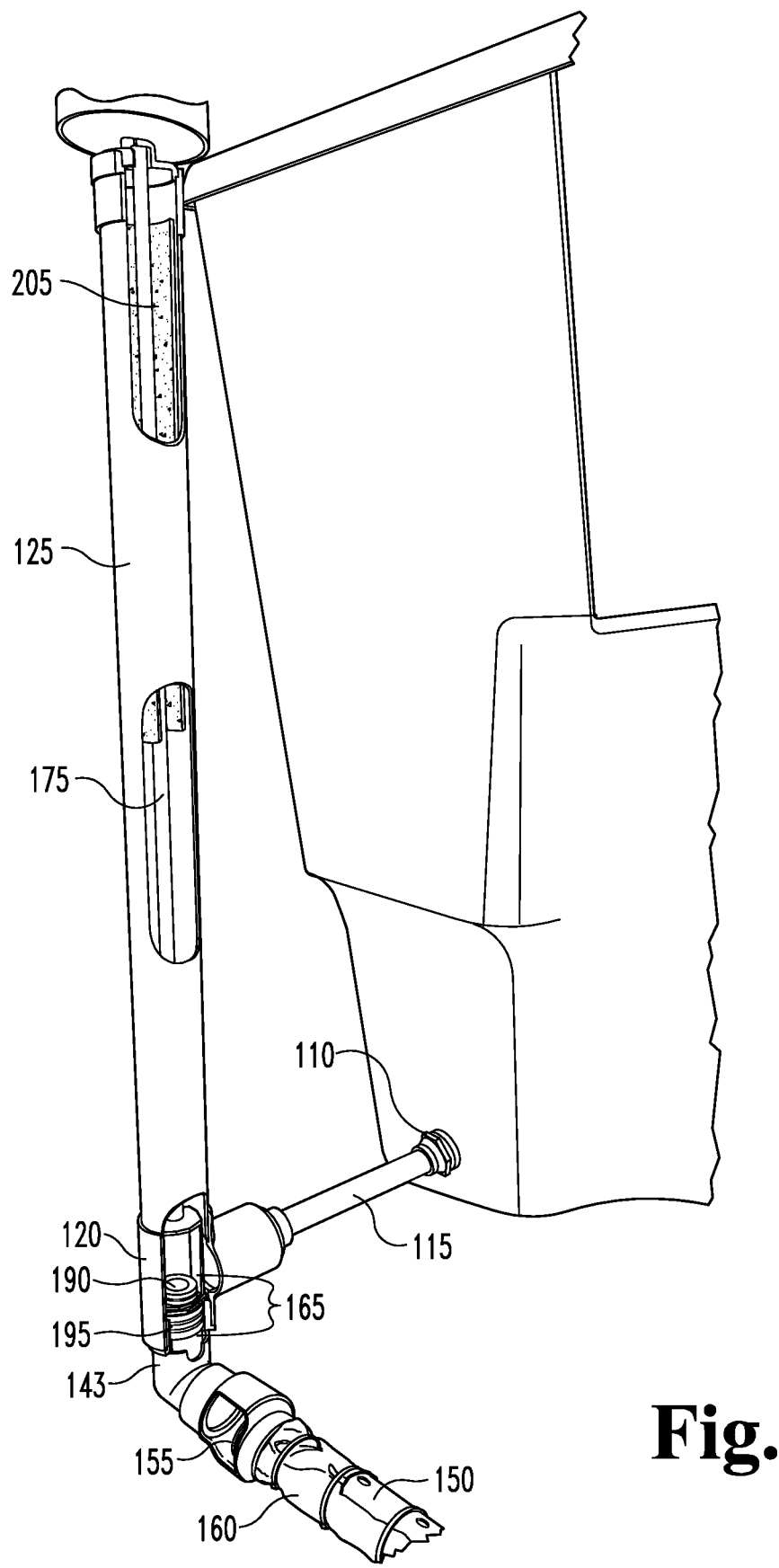
FIG. 8 is an enlarged partial perspective cutaway view of the valve system of FIG. 7.
Figure 9:
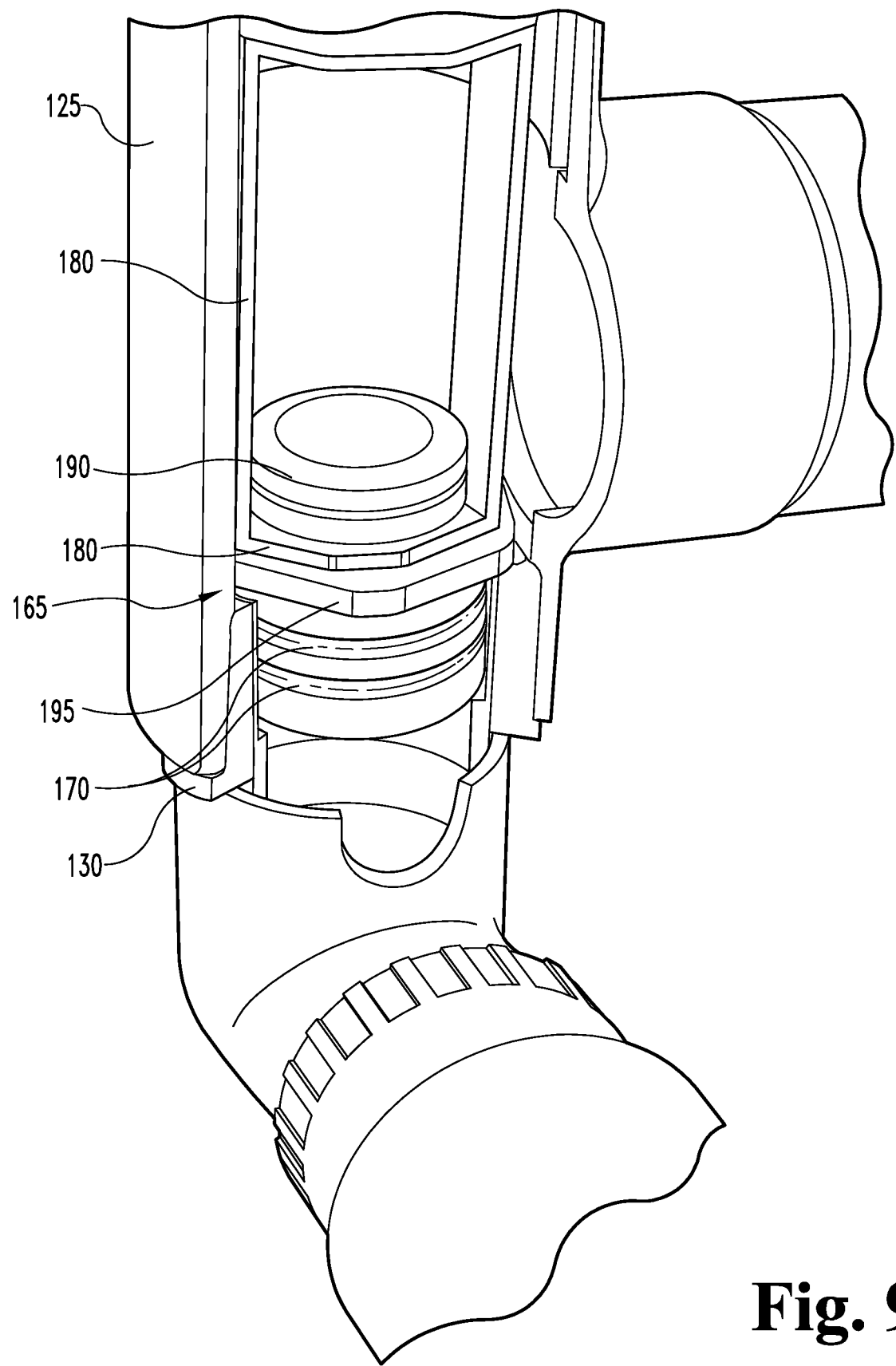
FIG. 9 is an enlarged partial perspective cutaway view of the valve system of FIG. 8.
Figure 10:
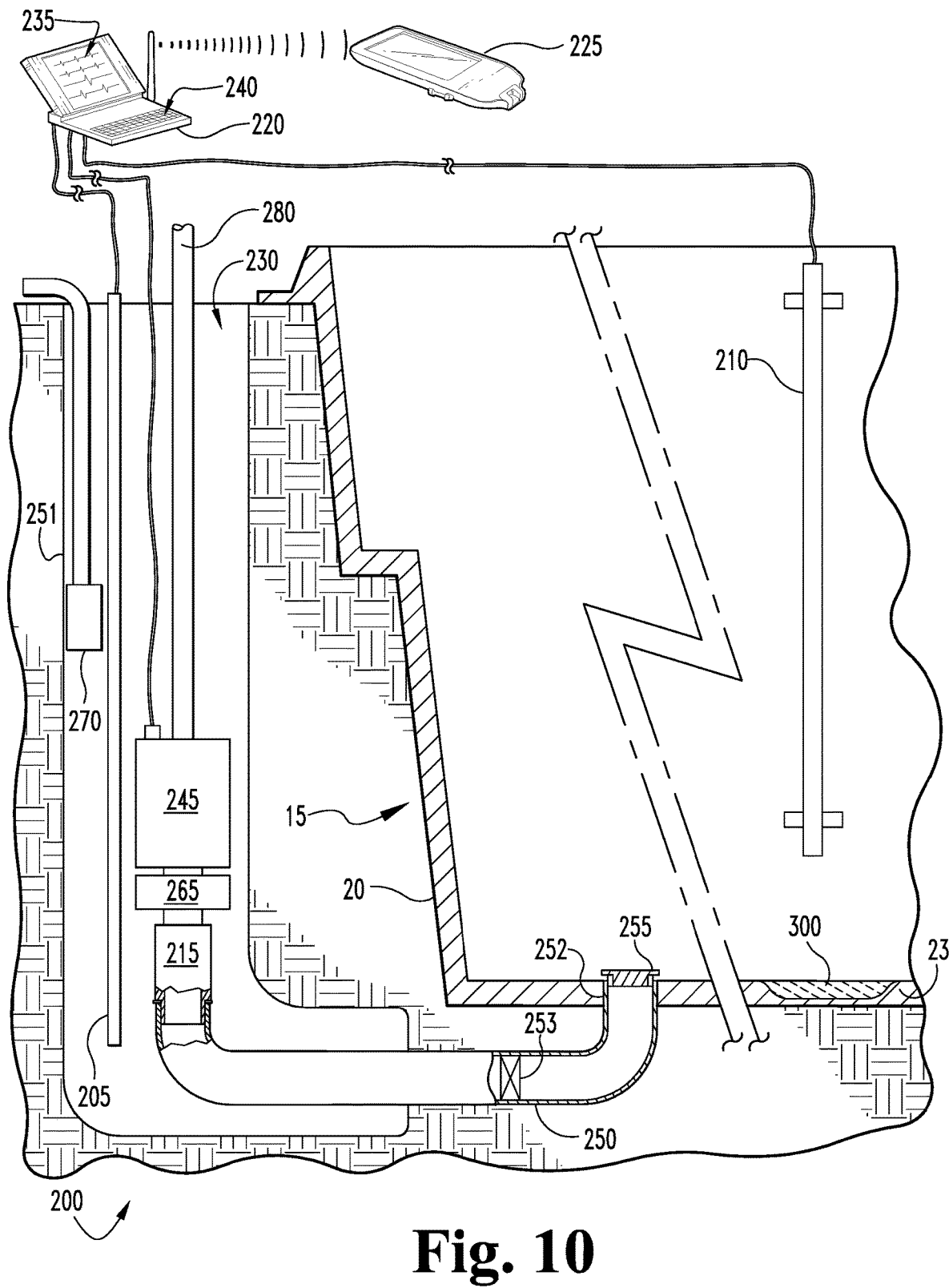
FIG. 10 is an exploded perspective view of a valve system for automatically equalizing hydrostatic pressure without and within a pool body, according to yet another embodiment of the present novel technology.

In another embodiment, as seen in FIGS. 5-9, a hydro valve system 100 is disclosed for equalizing water pressure without and within the pool body 15. The system 100 includes a fluidic access port 110 positioned on or through the pool sidewall and extending therethrough. The port 110 is typically positioned within twenty-four inches of the bottom of the pool body 15, more typically within twelve inches from the bottom of the pool body, and still more typically within 6 inches from the bottom of the pool body. A fluidic conduit 115 extends generally horizontally from the port 110 to a T-junction or like intersection 120 with an elongated fluidic conduit portion 125. The T-junction 120 connects to the fluidic conduit 125, which extends generally vertically away from the T-junction 120 toward the top edge 35, and is typically positioned generally perpendicularly to conduit 115. Fluidic conduit 130 typically extends generally vertically away from the T-junction 120 opposite conduit 125, i.e., away from the top edge 35. Conduit 125 typically includes a (typically threaded) terminal end 135 near the top edge 35 and more typically includes a (typically threaded) cap 140 removably engageable to the terminal end 135.

Conduit 130 typically connects to an L-shaped or like connector or joint 145, which connects at one end to conduit 130 and at the other end to conduit 150 through check valve 155 operationally connected thereto. Conduit 150 extends perpendicularly to conduit 130, and is typically positioned below the bottom of the pool body, and may be directed away from, parallel to, or under the pool body 15. Conduit 150 is typically perforated or otherwise water permeable, and is more typically covered by a silt sock 160 for allowing passage of water therethrough while blocking particulate matter. The check valve 155 allows for flow from conduit 150 to conduit 130, but not from conduit 130 to conduit 150.

Hydrostatic valve 165 is removably positioned in conduit 130. Typically, conduit 130 defines an inner diameter sized to snugly receive hydrostatic valve assembly 165 in an interference fit. Hydrostatic valve 165 is opened by pressure from and directs water flowing from conduit 150 through check valve 155 and into conduit 130 and on through conduit 115 into the pool body 15, in the event of an excess of build-up of water under the pool body 15. Hydrostatic valve 165 is closed by the flow of water from the pool body 15 through conduits 115 toward conduit 130. The water pressure associated with excess water building up under the pool body 15 is thus relieved by directing the excess water into the pool body 15, reducing the likelihood of the water pressure upwardly urging and displacing the pool body 15.

Hydrostatic valve 165 is held in place in conduits 120 and/or 130 by one or more O-rings 170 or like members snugly encircling valve 165 and participating in an interference fit with conduits 120 and/or 130, resting in preformed grooves or the like, and may be inserted and/or removed through conduit 125, such as by use of an elongated removal tool 175 extending through terminal end 135 to conduit 130. Removal tool 175 is typically an elongated structural member, such as a plastic rod or the like, extending from cap 140 through conduit 125 and terminating in a valve gripping member 180. Valve gripping member 180 is typically a hollow cage housing the valve 165, such that an upward force applied to the cage 180 via the elongated rod 175 urges the hydrostatic valve 165 up and through the conduit 125 where it may be serviced or replaced if necessary. This allows the hydrostatic valve 165 to be pulled, changed, and/or cleaned from the pool deck without the need of personal submersion. The hydrostatic valve 165 is inserted and/or removed without the need of threading. Leakage or removal of the hydrostatic valve 165 does not result in water emptying from the pool body 15.

The hydrostatic valve 165 typically includes a first valve portion 190 connectible to a base portion 195, with the base portion 195 supporting the O-rings 170 for connecting within the conduits 120, 130. Conduits 120 and 130 are typically separate, but in some embodiments may be unitary.

A liner 205, typically a closed-cell foam cylinder (such as a commercial pool noodle) is emplaced in cylinder 125 and positioned to extend from adjacent the cap 145 a sufficient distance downward below the freezing depth to displace groundwater that might otherwise fill cylinder 125 during operation. This liner 205 eliminates the need to 'winterize' conduit 125 by preventing water to rise far enough therein such that it might freeze during cold weather and expand sufficiently to rupture conduit 125.

In operation, the valve assembly 100 is operationally connected to the fluid access port 110 prior to or during placement of the pool body 15 into the ground. The elongated portion extends upwardly generally parallel to the pool body sidewall 25, while conduit 150 typically extends generally perpendicular to the sidewall 25. Conduit 150 is typically positioned below the level of, and more typically generally adjacent to, the pool body 15. The assembly 100 is buried when the pool excavation is backfilled, typically with only the end of elongated conduit 125 and cap 145 protruding above ground.

If the pool, once filled with water, is drained below the level of the ground water surrounding the pool body 15, ground water will flow through conduit 150, through check valve 155 and hydrostatic valve 165 and into the pool body 15 through access port 110. In other words, when the level of the ground water without the pool body 15 is higher than the level of the water within the pool body 15, water will flow thorough the assembly 100 and into the pool body 15 through the access port 110. This prevents damage to the pool body 15 from excessive ground water pressure thereupon, such as bulging of the pool body to the point of cracking or rupture, and/or raising of the entire pool body 15.

In another embodiment, a system 200 for preventing pool damage due to accumulated ground water includes a pair of water level sensors 205, 210, at least one valve 215, a microprocessor 220 programmed with control logic, and an actuation assembly (such as a motorized piston and gland) 245.

A first water level sensor 205 for monitoring ground water levels is positioned in a well pit 230 adjacent the pool body 15, while a second water level sensor 210 for monitoring pool water levels is operationally connected to the pool body 15 or in the valve assembly 100, as the water levels in the pool body 15 and the valve assembly 100 are equal. The water level sensors 205, 210 are typically connected in electric communication with the microprocessor 220, which is more typically in wireless communication with a telephone app 225. Typically, the microprocessor 220 is also typically connected in electric communication with a display 235 positioned in the well pit 230 or elsewhere for review, and with a user interface positioned 240 near the display 235.

A (typically electric) valve 215 is operationally connected to the pool body 15, such as to the pool floor 23 or through a portion of the pool wall 25 adjacent the floor 23, and operationally connected to the well pit 230, such as by the actuation assembly 245. The system 200 includes an inlet tube or conduit portion 250 extending through an access port 252 formed through the pool floor 23 (or wall 25), and a cover 255 operationally connected over the same 250, 252. The valve 215 is disposed in the inlet tube 250. A second conduit portion 251 is fluidically connected to the first conduit portion 250 and extends upwardly toward the top of the pool wall 25. The second conduit 251 may be the well pit 230, or may be separate. More typically, a check valve 253 is positioned in the conduit portion 250 between the valve 215 and the port 252, to prevent water flowing from the pool.

Actuator assembly 245 is operationally connected to the valve 215 and is also connected in electric communication to the microprocessor 220 and/or in wireless communication to a telephone app 225, as well as in electric communication with a power source 265. The power source 265 may be AC current, a battery backup, some combination of both, or the like. Communication to the pool owner via their cell phone app 225 provides a warning of increasing ground water levels as well as providing instructions for minimizing or eliminating the risk of pool damage due to ground water.

In operation, the microprocessor receives signals from the sensors 205, 210 and compares the level of the ground water to the water level in the pool body 15. When the water level in the pool body 15 decreases to a first predetermined level relative to the level of the ground water outside the pool body 15, the microprocessor 220 sends an alert to the display 235 and, more typically, to the telephone app 225. When the water level in the pool body 15 decreases to a second, lower predetermined level relative to the level of the ground water outside the pool body 15, the microprocessor 220 may automatically energize the actuator assembly 245 to open the valve 215 to relieve the hydrostatic pressure on the pool body 15 as generated by the ground water. Further, the microprocessor 220 may be programmed to send an alert signal when the ground water rises past a predetermined level, so that a sump pump 270 may be placed in the well pit 230 and (or if already in the well pit 230 energized to remove standing water.

A user may also manually energize the actuator 245 at any desired time, through the microprocessor 220 user interface or the phone app 225. The user may query the microprocessor 220 (directly or through the app 225) to check the ground water level and/or pool water level at any time.

The actuator assembly 245 and the electronic valve assembly 215 are accessible for maintenance. This is convenient because the valve 215 and associated hardware 245 is typically located within two feet or less of the pool wall 15 inside the well-pit 230. The valve is serviced through the retraction of a rod 280 connected to the valve 215 and/or actuator assembly 245, pulling the same 215, 245 out of the well-pit.

One failsafe that may be built into a pool body 15 as a 'last resort' is a built-in stress riser 230. Groundwater can cause catastrophic damage to any in-ground swimming pool if not controlled, and an empty in-ground pool body 15 is particularly susceptible to the upward forces imparted by groundwater under and around the pool body, such that the pool body 15 may be catastrophically dislodged from the ground. Dewatering systems, well points, hydrostatic valves and simple instructions to never drain the pool water sometimes fail due to mechanical failure, electrical failure, and/or human error. Damages done to fiberglass and concrete pools is typically structural, due to the effects of buoyancy. The groundwater may buckle or crack the floor 23 of the pool body 15, and other structural damage may occur which is typically extremely expensive to repair.

Additional damage which is common are walls are pulled in on fiberglass pool bodies 15, plumbing and electrical systems are damaged and expensive concreate or decks around pools are damaged if the pool "floats" or "pops" out of the ground. The repair costs associated with floating a pool is prohibitive. To avoid potential catastrophic damage to fiberglass pools a groundwater heave protection device 300 has been developed. The device 300 may be implemented into the floor of the fiberglass pool body 15 so as to provide a structural weakness in the pool bottom 23 that will fail before the groundwater pressure is sufficient to "pop" or "float" the pool body 15 out of the ground. The device 300 may be molded and formed into the fiberglass pool floor 23 as a unitary piece or may be inserted into the fiberglass floor 23 during the manufacturing process. Likewise, such a stress-riser device 300 may be incorporated into concrete pool bodies 15. The device 300 creates a stress concentration or stress riser or otherwise weakened area in the floor 23 of the fiberglass pool body 15, such that hydrostatic or buoyancy forces preferentially split the pool body 15 at the stress-riser device 300, allowing water to enter the pool body 15 to relieve the hydrostatic forces on the pool body 15, causing only localized and easily repairable damage to the pool body 15 in the process. In other words, the pressure from groundwater accumulation will crack open the insert or molded in stress riser 300 and allow groundwater to pour into the pool instead of causing catastrophic damage to the pool and/or its surroundings. The pool body 15 includes a stress riser 300, typically an area of thinned material so the water pressure rips or separates the pool floor 23 at the thinned material 300 and opens to allow water to flow into the pool, relieving the pressure and adding mass to the pool contents. The location and size of the molded stress riser or device is a function of the shape and size of the pool. When groundwater pressure cracks the groundwater heave protection device 300 it does damage to pool floor 23 in a very small, restricted, and predetermined area which is easily repaired. The split in the floor 23 is typically repaired by grinding, glassing over the split and/or applying gel coat. This repair is done simply and is very inexpensive compared to repairing a floated pool.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A method of reducing hydrostatic pressure on an in ground preformed swimming pool body, comprising:
  a) determining a ground water level;
  b) determining a swimming pool water level;
  c) comparing the ground water level to the swimming pool water level;
  d) when the swimming pool water level decreases to a first predetermined level relative to the ground water level, sending an alert to a display; and
  e) when the swimming pool water level decreases to a second, lower predetermined level relative to the ground water level, flowing ground water into the swimming pool body.

2. The method of claim 1, and further comprising:
  f) operationally connecting a valve between the ground water and the swimming pool water;
  g) positioning water level sensors in the ground water and the swimming pool water to measure their respective levels;
  h) operationally connecting a microprocessor to the respective water level sensors;
  i) operationally connecting a valve actuator to the valve and to the microprocessor; and
  j) operationally connecting a power source to the valve actuator.

3. The method of claim 1 wherein during step d), water flows through a check valve positioned below the ground water level and above the swimming pool water level.

4. The method of claim 1 and further comprising:
  k) when the ground water rises to a third predetermined level, pumping ground water away from the swimming pool.

5. The method of claim 2 wherein the microprocessor is in wireless communication with a mobile telephone.

6. The method of claim 1 wherein step e) is manually initiated.

7. A method of preventing dislodgement of an in ground preformed swimming pool body, comprising:
  a) determining a ground water level;
  b) determining a swimming pool water level;
  c) comparing the ground water level to the swimming pool water level;
  d) when the swimming pool water level decreases to a first predetermined level relative to the ground water level, sending an alert to a display;

e) when the swimming pool water level decreases to a second, lower predetermined level relative to the ground water level, flowing ground water into the swimming pool body;
f) pumping ground water away from the swimming pool body when ground water exceeds a third predetermined level;
g) extending a plurality of geotextile sheets away from the swimming pool body, wherein each respective geotextile sheet is connected to the swimming pool body and frictionally engaged with packed soil; and
h) forming a stress-riser in the swimming pool body for splitting the pool body to allow influx of ground water when hydrostatic pressure exceeds a first predetermined threshold.

8. The method of claim 7, and further comprising:
i) operationally connecting a valve between the ground water and the swimming pool water;
j) positioning water level sensors in the ground water and the swimming pool water to measure their respective levels;
k) operationally connecting a microprocessor to the respective water level sensors;
l) operationally connecting a valve actuator to the valve and to the microprocessor; and
m) operationally connecting a power source to the valve actuator.

* * * * *